United States Patent Office 2,705,197
Patented Mar. 29, 1955

2,705,197

WALLBOARD COMPOSITION AND METHOD OF MAKING SAME

Hermann G. Seybold, Westport, Conn.

No Drawing. Application April 19, 1950,
Serial No. 156,951

3 Claims. (Cl. 92—3)

This invention relates to light weight structural board, sheet insulating material, and the like, hereinafter called "wallboard" for simplicity, containing fibrous material, mineral filler and binder composition, and to methods of producing the same.

A general object of this invention is to provide such fiber-containing wallboard which is unusually heat insulating and fire resistant, light in weight, strong, excellent sound-proofing material, relatively free from tendencies to warp and swell on exposure to moisture, substantially waterproof, and desirably inexpensive to manufacture; and a unique method of producing the same.

A more specific object of the invention is to provide fiber-containing wallboard which includes particles of expanded perlite as a mineral constituent uniformly distributed throughout the body thereof.

A further object is to provide a unique method for securing and maintaining uniform distribution of expanded perlite particles in a cellulosic fiber-containing material throughout its fabrication into wallboard.

Another object of the present invention is to provide such wallboard which includes with fibrous material and particulate expanded perlite a resinous binder that contributes unusual properties thereto and makes possible the practice of the unique method of producing the same.

Other objects of the invention will in part be obvious and will in part appear hereinafter.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

The present wallboard preferably includes as its fibrous ingredient any suitable organic and/or inorganic fibrous material such as cellulose fiber and/or glass fiber; a mineral filler ingredient comprising or including, or consisting of particles of expanded perlite; and binder composition of the thermosetting synthetic resin type.

Expanded perlite is a particulated mass of naturally occurring perlite which has been subjected to expansion under high temperature treatments. It has a very low density and resists wetting by water. The material tends to float on water even after prolonged exposure thereto.

Expanded perlite differs remarkably from exfoliated vermiculite, at least in that respect. The latter tends to become wetted upon substantial exposure to water, probably due to absorption of water into the exfoliated spaces, with the result that vermiculite after thorough wetting acquires an apparent density greater than that of water. I am aware of prior proposals to add exfoliated vermiculite to a slurry of cellulose fibers in manufacture of wallboard. However, the resulting board if reasonably fire-retardant does not possess a desirable degree of strength or sufficient resistance to water. Moreover, the dispersion of exfoliated vermiculite uniformly throughout a slurry of cellulose fiber in water does not present any substantial problem because of the above mentioned absorption of water into the exfoliated spaces.

In contrast to exfoliated vermiculite, I have found that expanded perlite by reason of its tendency to float on water, even upon prolonged subjection thereto, prevents maintenance of a uniform dispersion thereof throughout a slurry of cellulose fibers in water during fabrication of wallboard. While uniform distribution might be obtained in certain cases of extreme agitation, the expanded perlite rises in the slurry at least whenever the agitation ceases, thus tending to prevent production of a wallboard containing expanded perlite in uniform distribution by any of the methods heretofore generally employed in the manufacture of such board.

I have found, for example, that wallboard containing cellulose fibers and expanded perlite characterized by substantially uniform distribution of the particulate perlite can be obtained when the latter is first intimately mixed with a water non-soluble, thermosetting synthetic resin. The required intimate mixture may be obtained, for example, by grinding, tumbling or shaking expanded perlite with suitable quantities of such resins in powder form. As a result, particles of perlite have adhered to them or are covered with the particles of resin such that the densities of the resulting separate agglomerate bodies are increased to the point that they become compatible with the slurry of cellulose fiber in water in uniform distribution which will be substantially maintained throughout the process of forming the resulting material into wallboard. Thermosetting resins suitable for this use are, for example, phenolic resins, urea resins and melamine resins. They are preferably employed in powder form and may be employed in the form of commercially available molding powders containing modified or unmodified plasticized or unplasticized thermosettting resin. However, I generally prefer a powdered thermosetting resin which contains little or no filler. The resins employed should be substantially non-soluble in water to avoid their expression from the wallboard composition in solution in water during the board forming operation in which the composition is dewatered. In many instances it is desirable that such resins also contain a small amount of hardener to catalize or facilitate final curing. Partially reacted phenol-formaldehyde resins are to be preferred where maximum strength of the finished board is desired. A suitable water non-soluble phenol-formaldehyde resin, preferably utilized in powder form, is commonly known as a mixture of one step and two step (Novolak) phenolic resins ground and blended together with addition of a small quantity of hexamethylenetetramine to function as a hardener. Such a resin powder which by way of example may be here used is produced by the Bakelite Corporation under the designation BR-15401.

In the practice of one form of my invention about 50 to 70 parts by weight of expanded perlite are intimately mixed, for example, by grinding, with about 10 to 16 parts by weight of resin. The resulting intimate mixture is slowly added to an agitated slurry or suspension of about 10 to 30 parts by weight of cellulose fiber, such as kraft, newsprint or wood fiber, in a suitable quantity of water. For formation of the cellulose fiber slurry, I prefer to use an amount of water equivalent to about twenty times the weight of the cellulose fiber employed although any quantity of water commonly used in the production of cellulose fiber slurries may be employed. To such slurry the resin-perlite mixture is added with agitation and the agitation is maintained for about 5 to 20 minutes until a uniform distribution is obtained. Enhancement of ultimate water resistance of the finished board may be obtained by adding to the perlite-resin-cellulose fiber suspension, while still under agitation, about 1 to 3 parts of soap dissolved in any suitable quantity of water, and after about 1 to 5 minutes further agitation to distribute the soap, a sufficient quantity of water-soluble acidic material, for example, acids, or acidic salts, such as alum in water solution, is slowly added to neutralize the suspension as indicated by pH paper or other indicating means. The acidic material causes precipitation of the soap and the precipitated soap particles remain in suspension in the slurry. If acidic material is added substantially in excess of the amount required for neutralization, the slurry has a tendency to "set up" or become curdled. Wherever hereinafter a quantity of soap ingredient is referred to as a constituent of particular mixtures it is to be understood that the neutralizing acidic material as referred to above is included in the amount given for that soap ingredient. The resulting mixture or slurry composition is then cast into a felted layer, such as by a Fourdrinier machine, or by pouring into a board-forming mold, for example, a form having a screen bottom, and the material or slurry composition in the form may be, by means of a suitable press, subjected to a pressure of about 100 to 400 pounds per square inch to compact and dewater it, i. e. to express the surplus liquid therefrom. This operation may be described as the cold press operation. The wet formed board is then placed in a hot press where it is subjected again to a pressure of about 100 to 400 pounds per square inch but at a temperature of about 200° to 400° F. for a period of about 10 to 35 minutes depending on the thickness of the board. I have found it desirable in many cases to lubricate the plates of the hot press with a lubricant such, for example, as a stearate to overcome any tendency of the board to stick to the plates. This hot press procedure converts the resin into a thermoset stage to serve as an effective binder in the composition. The resulting board is unusually strong, fire resistant, light in weight and readily adapted to use in normal construction and fabrication operations. In lieu of subjecting the wet formed board to heat and pressure in a hot press, the wet board may be subjected to drying for about 6 to 18 hours at temperatures of about 100° to 200° F. without application of pressure. The resulting board is lighter per unit volume and may be less strong than board cured by simultaneous application of heat and pressure.

Increase in the amount of resin within the above limits results in some increase in strength and also in an increase in density of the finished board. By contrast, variations in the weight ratio of expanded perlite to cellulose fiber have little effect on the density but a considerable effect upon strength of the resulting board. I have found that with a given amount of resin the optimum strength is obtained with a ratio by weight of the perlite to cellulose fiber of about 3:1. Contrary to the general supposition that an increase in cellulose fiber content would result in increased strength, I have found that when the weight ratio of expanded perlite to cellulose fiber is decreased appreciably from 3:1 the strength of the resulting board decreases. I have also found that, while maximum strengths are obtained with a weight ratio of expanded perlite to cellulose fiber of about 3:1, satisfactory strengths are obtained when this weight ratio is maintained between about 1.5:1 and 5:1.

An example of a wallboard which has been found to be highly satisfactory in all respects, such as strength, rigidity, fire resistivity, lightness of weight, economy in manufacture, adaptability to a variety of types of construction and fabricating, and substantial maintenance of those features under a variety of conditions without any appreciable change in shape, may be made as follows: A slurry of 20 grams of newsprint fiber in 500 cc. of water is formed by agitation in a beater. 60 grams expanded perlite is intimately mixed with 15 grams of Bakelite BR-15401 powder by gentle grinding in a mortar for 2 minutes. This perlite-resin mixture is slowly added to the cellulose fiber slurry under agitation in the beater. Continuing agitation of the resulting slurry, 3 grams of soap, dissolved in a suitable quantity of water, is added and after 2 minutes (to allow for uniform distribution of the soap) a quantity of alum solution sufficient to neutralize the slurry as indicated by pH paper is added. In this instance 10 cc. of a 30° Baumé solution of alum was required for the neutralization but the required amount will vary depending upon the alkalinity of the particular slurry composition. The slurry composition was then poured into a board forming mold having a screen bottom and subjected for 2 minutes to a pressure of 300 pounds per square inch to compact and dewater it. The resulting wet ½ inch board was placed in a hot press where it was subjected to a pressure of 300 pounds per square inch and a temperature of 300° F. for 20 minutes. The resulting cured board was ¼ inch in thickness, and had a modulus of rupture of the order of 2500 pounds per square inch.

By way of modification the same procedure is followed through production of the wet ½ inch board which was then subjected to air drying at a temperature of 145° F. for 7 hours. The resulting board is only slightly under ½ inch in thickness, is considerably lighter than the hot press board but also exhibits somewhat lower strength.

Modification of the above example by omission of addition of soap and acid results in a strong light-weight fire resistant board but one which, by contrast with the board of the example, is not as highly water-resistant, which may be suitable for some uses.

It will be understood that curing time, whether with or without application of pressure is dependent upon the thickness of the wet board. Thus, while I have found that wet board ½ inch in thickness often requires no longer than 15 minutes in a hot press at 365° F. and 300 pounds per square inch pressure, under similar conditions of temperature and pressure wet board 1 inch in thickness may require about 25 minutes and that 1½ inches in thickness may require about 30 minutes in the hot press.

My tests have shown the feasibility of substituting other particulated mineral material for a portion of the expanded perlite and good results have been obtained with such a substitution wherein the other mineral filler material is in a quantity up to about equal to that of the expanded perlite. Diatomaceous earth, for example, in the form marketed under the trade-name "Celite," and unexpanded or natural perlite have been found to be excellent partial substitute mineral filler materials for this purpose. However, since both are heavier than expanded perlite, the final desired weight of the board will be a controlling factor that must be given due consideration in making such substitutions for a portion of the expanded perlite. For example, the approximate percentages by weight of the constituents of the mixture of an acceptable wallboard containing diatomaceous earth may be about as follows:

| | Per cent |
|---|---|
| Cellulosic fiber | 20.00 |
| Expanded perlite | 31.00 |
| Diatomaceous earth ("Celite") | 30.00 |
| Thermosetting synthetic resin | 15.00 |
| Soap ingredient | 4.00 |
| Total constituents | 100.00 |

Further, other fibrous material may be substituted for a portion of the cellulosic fiber ingredient, and such fibrous material may be of a mineral nature so as virtually to serve a dual purpose of functioning both as a portion of the fibrous ingredient and the mineral filler ingredient. For example, asbestos fiber or glass fiber may be employed for this dual purpose. Also asbestos fiber or glass fiber may be substituted for a portion of the cellulosic fiber ingredient. Particulated asbestos, diatomaceous earth or unexpanded perlite may be substituted for a portion of the expanded perlite. In such a composition, quantities of the various constituents may be somewhat dictated by weight factors, the heavier weight of asbestos or glass fiber possibly being offset by a greater proportional quantity of expanded perlite to give more volume while keeping the unit weight down. A board having the following composition has been found to be very hard and highly fire-resisting while having an excellent water-repellent characteristic:

| | Per cent |
|---|---|
| Cellulosic fiber | 16.75 |
| Expanded perlite | 52.00 |
| Asbestos fiber | 17.00 |
| Thermosetting synthetic resin | 11.00 |
| Soap ingredient | 3.25 |
| Total constituents | 100.00 |

It will be noted that the novel method of assuring even distribution of the very light particles of mineral filler or expanded perlite features weighting those particles by adhering thereto or covering them with particles of heavier binder material, more specifically, the thermosetting synthetic resin. It is to be understood that this unique step in the method of making the composition of the present invention is not limited to an admixture of expanded perlite and the binder resins, since other lighter-than-water filler materials or mineral fillers used in substitution, at least partially, for the expanded perlite may be so weighted for a like purpose.

It will thus be seen that the objects set forth above, among those made apparent from the preceding description, are efficiently attained and, since certain changes in carrying out the above process, and certain modifications in the composition which embody the invention may be made without departing from its scope, it is intended that all matter contained in the above description shall be interpreted as illustrative and not in a limiting sense.

Having described my invention, what I claim as new and desire to secure by Letters Patent is:

1. In a method of making wallboard from aqueous slurries of dispersed solid constituents including commercial grades of expanded perlite particles having a specific gravity less than water and substantially incapable of absorbing the latter and tending to remain floatable thereon, the steps comprising weighting said expanded perlite particles by adhering to the surfaces thereof particles of unset water non-soluble thermosetting synthetic resin to form agglomerate bodies heavier than water, adding said weighted expanded perlite particles to slurry liquor, and forming cured board from the resultant mixture.

2. A method of making wallboard comprising intimately mixing about 50 to 70 parts by weight of particles of commercial grades of expanded perlite with about 10 to 16 parts by weight of particles of unset water non-soluble thermosetting synthetic resin to form agglomerate bodies heavier than water; mixing said agglomerate bodies into a slurry comprising water and cellulosic fibers until a substantially uniform distribution of solids is obtained, the cellulosic fibers constituting about 10 to 30 parts by weight of the composition of the wallboard; forming board from the resulting admixture; and applying heat and pressure to the formed board to compact and cure the same.

3. A pressed, heat-cured wallboard comprising, as the major constituents thereof, about 50 to 70 parts by weight of particles of mineral filler at least about half of which consists of commercial grades of expanded perlite particles, a felted mass of about 10 to 30 parts by weight of fibrous material fibers, and about 10 to 16 parts by weight of set binder material comprising thermoset synthetic resin, said mineral filler particles and thermoset resin being substantially uniformly distributed throughout said felted mass with said resin intimately bonding said fibers and particles into the mass and together, the weight ratio of said mineral filler to said fibers being between about 1.5:1 and 5:1.

References Cited in the file of this patent

UNITED STATES PATENTS

| | | |
|---|---|---|
| 1,160,362 | Baekeland | Nov. 16, 1915 |
| 2,046,296 | Roos et al. | June 30, 1936 |
| 2,300,137 | Salisbury | Oct. 27, 1942 |
| 2,338,602 | Schur | Jan. 4, 1944 |
| 2,388,060 | Hicks | Oct. 30, 1945 |
| 2,462,255 | Charman et al. | Feb. 22, 1949 |
| 2,487,207 | Adams | Nov. 8, 1949 |
| 2,501,698 | Stecker | Mar. 28, 1950 |
| 2,510,661 | Safford | June 6, 1950 |
| 2,626,864 | Miscall et al. | Jan. 27, 1953 |

OTHER REFERENCES

Ralston, Bureau of Mines Information Circular No. 7364 (August 1946), pp. 6, 8 and 9.